Oct. 25, 1927.  
J. R. WINTON  
1,646,513  
WATER LINE TRAP  
Filed April 18, 1925  
2 Sheets-Sheet 1

Inventor:  
John R. Winton  
By: Wm. O. Bell  
Atty.

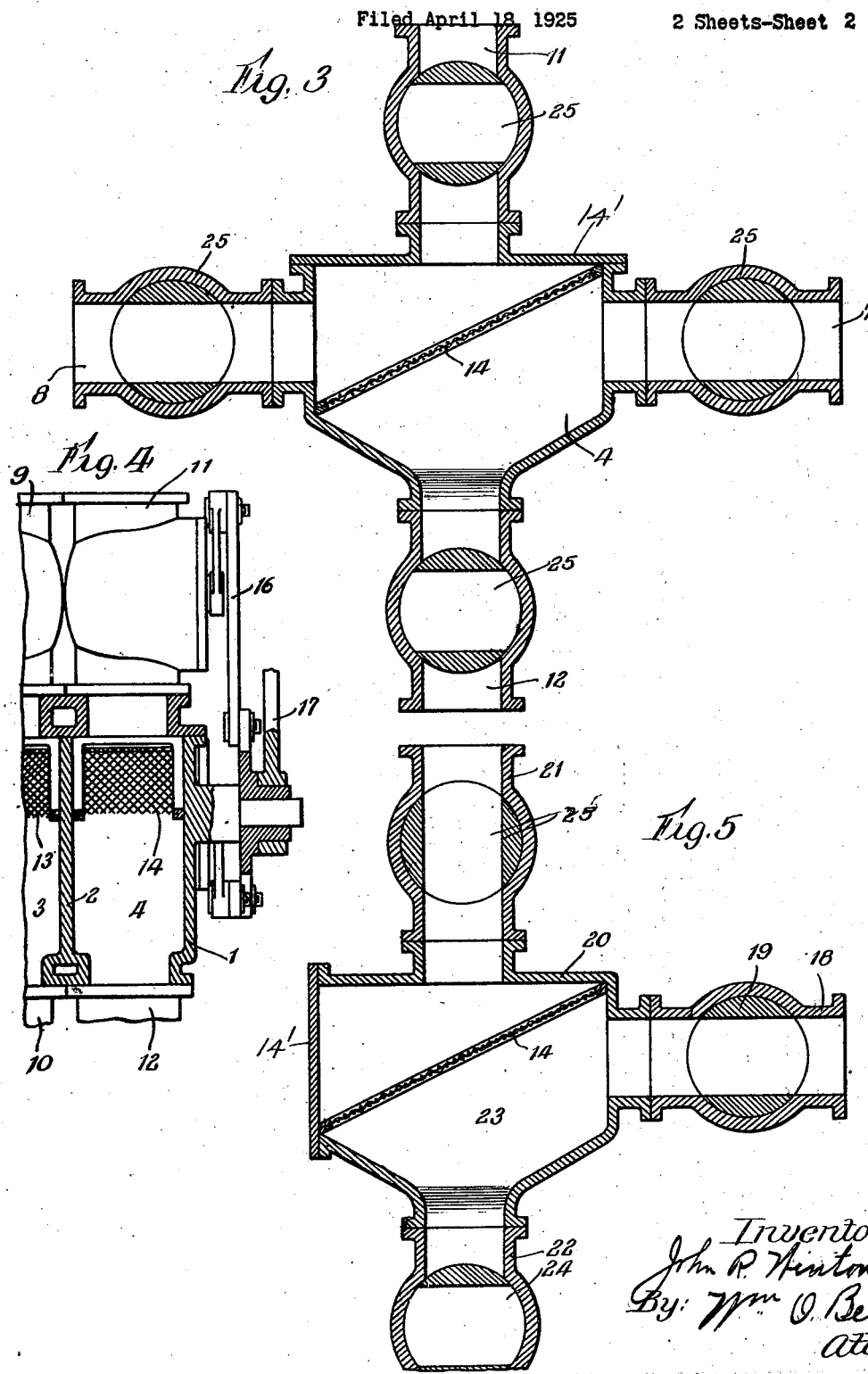

Patented Oct. 25, 1927.

1,646,513

UNITED STATES PATENT OFFICE.

JOHN R. WINTON, OF CHICAGO, ILLINOIS, ASSIGNOR TO MECHANICAL APPLIANCE COMPANY, OF CHICAGO, ILLINOIS, A CORPORATION OF ILLINOIS.

WATER-LINE TRAP.

Application filed April 18, 1925. Serial No. 24,016.

This invention relates to a novel and improved trap for use in a water-line and has for its primary object to provide a trap of this character so arranged that it will intercept refuse in the line and may be made to discharge the same without interference with the supply of water.

A still further object of my invention is to provide means to clean a water-line trap without interruption of the supply of water and by use of the water passing through the line.

A still further object is to provide convenient and efficient means for operating the trap cleaning means so that all the valves which must be operated during the cleaning may be operated in the proper manner.

In the accompanying drawings in which I have shown selected embodiments of my invention, Fig. 1 is an elevation of my invention as applied to a suction system.

Fig. 3 is a section on the line 3—3 of Fig. 2.

Fig. 4 is a section on the line 4—4 of Fig. 1, and

Fig. 5 is a view similar to Fig. 3 but showing my invention as applied to a pressure system.

Figure 1:
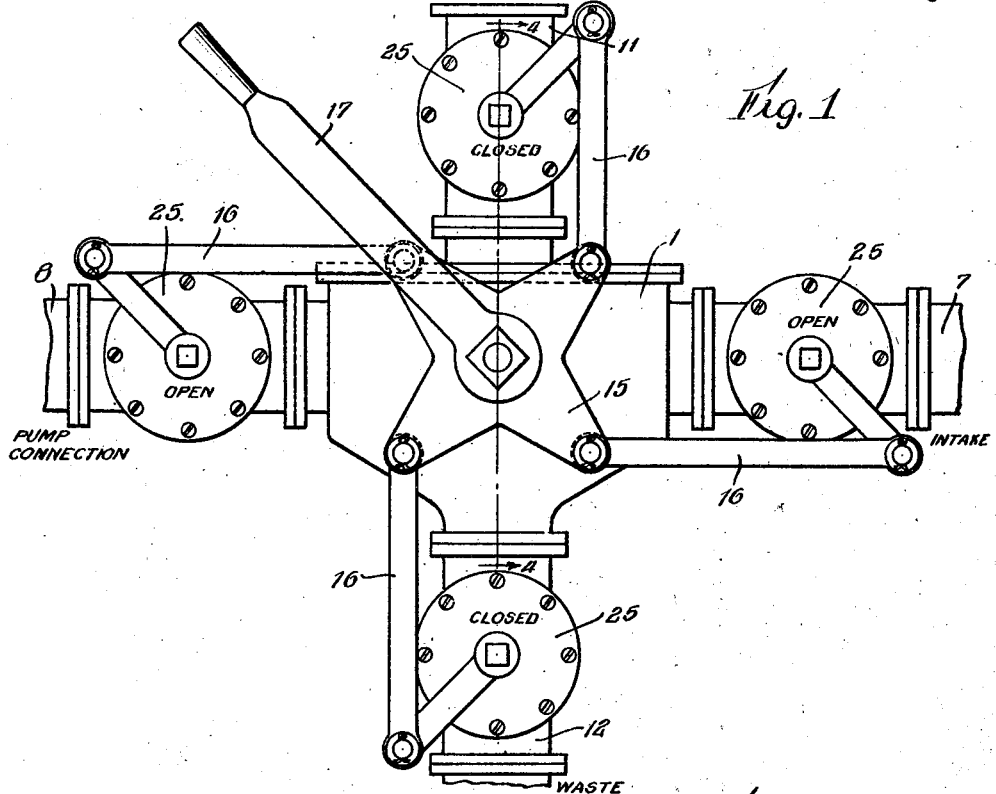

Referring now to the drawings and particularly to Figs. 1, 2, 3 and 4 wherein I have shown my trap as applied to a suction system, it will be seen that this trap comprises a casing 1 divided into two parts by a central partition 2 thus forming the chambers 3 and 4. Each chamber 3 and 4 is in the water-line, the chamber 3 being connected to the intake by means of a pipe 5 and to the pump or outlet by the pipe 6. Similarly the chamber 4 is connected to the intake by the pipe 7 and to the pump by the pipe 8. It will be noted that the pipes 5 and 6 and 7 and 8 respectively form a practically straight line and this is a preferable arrangement although not essential.

The chamber 3 is provided with a supply line and discharge line 9 and 10 respectively and the chamber 4 is provided with supply line and discharge line 11 and 12 respectively. Each chamber 3 and 4 has arranged diagonally across the same a screen 13 and 14 respectively. These screens may be secured in position in any desired manner as by the cover plate 14'.

Figure 2:
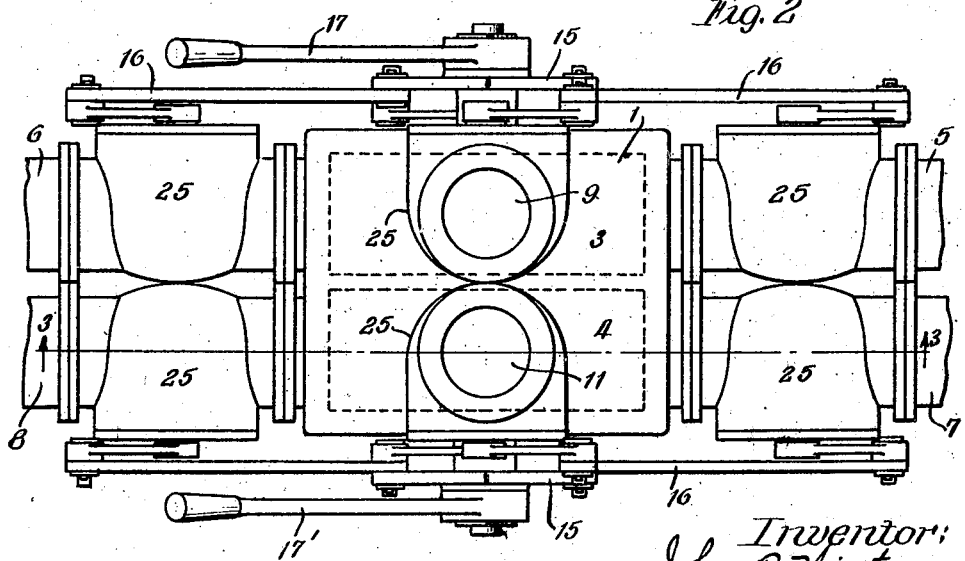
Fig. 2 is a plan view of the embodiment shown in Fig. 1.

The pipes forming the various connections are provided with suitable valves 25 as best shown in Figs. 1, 2 and 3. It will be seen that the valves in the pipes 7 and 8 are open at the same time so as to provide an uninterrupted flow of water therethrough and the same is true of the valves in the pipes 5 and 6. When these valves are open the valves in the supply and discharge lines 9, 10, 11 and 12 are closed, it being understood that the supply lines 9 and 11 are connected to any suitable source of water supply at the discharge end of the pump, and the discharge lines 10 and 12 are connected to any suitable discharge. The valves may be of any suitable form but I prefer to use a type such as that illustrated so that all the valves may be rotated in unison so as to be operated by one mechanism. Such a mechanism is exemplified by the spider 15 mounted upon the casing 1 and having arms connected to the various valves by suitable links 16. One of these devices is provided for each of the chambers 3 and 4 and the pipes connected therewith. In the operation of the device thus far described it is customary to have one branch formed for example by the chamber 3 and pipes 5 and 6, closed by suitable valves (not shown), and have the water supplied through the other branch, it being understood that the chamber 3 is nevertheless filled with water to preserve the suction in the line. In the use of water from rivers and lakes it is difficult to prevent large amounts of refuse and of fish from being taken into the line. It is essential to get rid of this refuse occasionally so as to maintain the flow of water uninterrupted and to maintain sanitary conditions. My invention provides a means for doing this without more than a momentary interruption to any kind of a line and in the suction system without any interruption whatsoever.

When for example it is desired to clean the chamber 4, the valves in pipes 5 and 6 are opened by operation of the handle 17 on that side of the casing the same operation closing the valves in the supply line and discharge line 9 and 10 respectively. The valves then occupy the same position as the valves shown in Fig. 3 and water flows through the chamber 3. Of course, if desired the other valves in the pipes 5 and 6 referred to above as not shown, may be omitted and placed in the supply lines and discharge lines but such valves should be provided in one set of pipes leading in and out of each chamber.

Water now is flowing through the chamber 3 from the source of supply to the pump and operation of the handle 17' on the other side of the casing will cause closing of the valves in the pipes 7 and 8 and opening of the valves in the supply and discharge lines 11 and 12 respectively. The suction of the pump is not disturbed because it is still taking water through the chamber 3. When the valve in the supply line 11 is open water is admitted and strikes the upper surface of the screen 14. The screen 14 is held in inclined position in the screen chamber between a corner in the wall of the chamber and intercepts any foreign matter contained in the water flowing through the chamber from the source of supply. When the discharge valve from the screen chamber and the flush valve for the screen chamber are opened whatever foreign matter is collected in the screen chamber and on the underside of the screen will be discharged from the chamber. The handle 17 on this side of the casing is again operated to close the valves in the supply and discharge lines 11 and 12 and to open those in the pipes 7 and 8, thus restoring these four valves to the position shown in Fig. 3. The entire operation takes only a few seconds at the most and the trap is thoroughly cleaned without any interruption whatsoever to the supply of water. The valves (not shown) which connect the pipes 7 and 8 to the main line may then be again opened and those which control the flow of water through the pipes 5 and 6 and the chamber 3 may be again closed, or if desired the flow of water may be maintained through both of the chambers 3 and 4. When it is desired to clean the chamber 3 obviously the same set of operations is followed.

Referring now to Fig. 5 I have shown therein an embodiment of my invention adapted for use in a pressure system wherein the water is supplied from the pump to the pipe 18 in which is placed a valve 19. The screen 14 in this embodiment is placed in a casing 20 generally similar to the casing 1 but in this embodiment the supply line 21 of the water-line is arranged vertically and made to serve the purpose of both of the pipes 8 and 11 shown in Fig. 3. The casing 20 is further provided with the discharge 22 corresponding in all essential respects to the discharges 10 and 12. In this form only one chamber 23 is necessary as there is no suction to be preserved.

The operation of this form of my invention may be briefly described as follows: The valves being normally in the positions shown in Fig. 5 the water enters the trap through the pipe 18 and out through the pipe 21, the screen interrupting refuse, which is deposited in the bottom of the chamber 23. When it is desired to clean the trap the valve in the discharge outlet 22 is opened momentarily and the refuse in the chamber is discharged, this discharge being aided by the fact that the water entering the trap will also to a very great extent flow out through the discharge outlet 22 after striking the screen and thoroughly cleaning the same. It is noted that the angle of inclination of the screen is particularly adapted for this result. After the water is shut off for the day or at a time when it can conveniently be shut off the valve 19 is closed and the valve 24 is opened thus permitting the water which has passed through the trap to flow back through the pipe 21 and thus clean the screen 14 by pressure from the upper side thereof so as to dislodge any refuse which may have become stuck thereon. This water which flows back through the trap is clean having once been screened and thus the screen itself will be thoroughly cleaned.

From the above it will be apparent that I have provided a trap which may be readily installed in a water-line with a minimum of expense and which will be most efficient in operation, requiring substantially no interruption of the supply of water to clean the same and being capable of cleaning in a very short time, a few seconds at the most, by a simple manual operation. All that is necessary is to open or close a few valves and by the arrangement shown in Figs. 1 to 4 inclusive this labor may be greatly reduced. In any case the valves are all close together and it is a very simple matter to operate them.

While I have described my invention as of use in connection with a water-line, it is obvious that its use is by no means thus restricted, as it may be employed wherever it is desired to screen a fluid. Moreover it will be noted that the screen 14 is placed at such an angle in respect to the normal course of water or other fluid flowing therethrough that any refuse which strikes the screen will be deflected to the bottom of the chamber and any refuse which is caught by the screen will tend to be dislodged by the fluid striking the screen.

I am aware that changes in the form, construction and arrangement of parts may be made without departing from the spirit and without sacrificing the advantages of the invention and I reserve the right to make all such changes as fairly fall within the scope of the following claims.

I claim:

1. A water line trap comprising a casing, intake and outlet lines for said casing, a supply line connected to the top of said casing, a discharge line connected to the bottom of said casing, a screen arranged in said casing and disposed vertically to the intake and outlet so that the underside of the screen obstructs the inflow of water and filters the water through the outlet, a valve in each of said lines, and means arranged on said casing and pivotally connected to each of said valves whereby the intake and outlet lines are opened and the supply and discharge lines are closed simultaneously with the opening of said intake and outlet lines.

2. A water line trap comprising a casing, intake and outlet lines for said casing, a supply line connected to the top of said casing, a discharge line connected to the bottom of said casing, a screen arranged in said casing and disposed vertically to the intake and outlet lines so that the underside of the screen obstructs the inflow of water and filters the water for the outlet, a valve in each of said lines, a spider pivotally connected to said casing, links pivotally connecting said valves to said spider, and a handle on said spider for operating said valves simultaneously to open the valves in two of said lines and closing said other valves whereby said screen may be cleaned by the discharge of water from the supply line passing through the casing and out of the discharge line.

3. A water line trap comprising a casing and forming a chamber, an intake line leading to said chamber, an outlet line opposite to said intake and forming an outlet from said chamber, a supply line connected to said casing and communicating with said chamber, a discharge line connected to said casing and disposed opposite said supply line, a valve in each of said lines, and a spider connected to all of said valves, whereby operation of said spider will simultaneously close the valves in two oppositely disposed lines and open the valves in the other lines.

JOHN R. WINTON.